United States Patent
McCoy, Jr.

(10) Patent No.: US 7,691,169 B2
(45) Date of Patent: Apr. 6, 2010

(54) PARTIALLY CHELATED CARBOXYLATE NUTRIENTS AND METHODS FOR THEIR PRODUCTION AND USE

(76) Inventor: Paul E. McCoy, Jr., 1675 Cinnamon La., Dunedin, FL (US) 34698

( * ) Notice: Subject to any disclaimer, the term of this patent is extended or adjusted under 35 U.S.C. 154(b) by 1044 days.

(21) Appl. No.: 11/390,767

(22) Filed: Mar. 28, 2006

(65) Prior Publication Data

US 2007/0227211 A1    Oct. 4, 2007

(51) Int. Cl.
| | |
|---|---|
| B41J 7/18 | (2006.01) |
| C05D 9/02 | (2006.01) |
| C05F 11/00 | (2006.01) |
| C05F 7/00 | (2006.01) |
| C05F 5/00 | (2006.01) |
| A01N 25/00 | (2006.01) |

(52) U.S. Cl. .................. 71/11; 71/25; 71/26; 71/27; 71/64.03; 424/400

(58) Field of Classification Search ............... 71/11, 71/25, 26, 27, 31, 64; 424/400, 403, 404, 424/405, 408; 426/74

See application file for complete search history.

(56) References Cited

U.S. PATENT DOCUMENTS

| | | | |
|---|---|---|---|
| 4,442,215 A * | 4/1984 | Vognsen et al. | ............. 435/262 |
| 5,453,277 A | 9/1995 | McCoy | |
| 5,487,772 A | 1/1996 | McCoy | |
| 2007/0227211 A1* | 10/2007 | McCoy, Jr. | .................... 71/31 |

* cited by examiner

Primary Examiner—Stanley Silverman
Assistant Examiner—Jennifer A Smith
(74) Attorney, Agent, or Firm—Larson & Larson, P.A.; Frank Liebenow

(57) ABSTRACT

Soil dispersible and water dispersible granular nutrients for use in fertilizers include granules having a crystallized saccharide and acid binder with carboxylates (sucrates) of a nutrient embedded therein and a method of preparing the nutrient containing granules is provided. A reducible nutrient compound and citric acid is converted to a nutrient carboxylate (sucrate) and chelate by reacting the reducible nutrient and citric acid with a sprayed stream of a stoichiometric excess of reducing saccharides (sugar cane molasses) containing at least 76% by weight solids and glacial acetic acid at a temperature of 160° to 175° F.

34 Claims, 2 Drawing Sheets

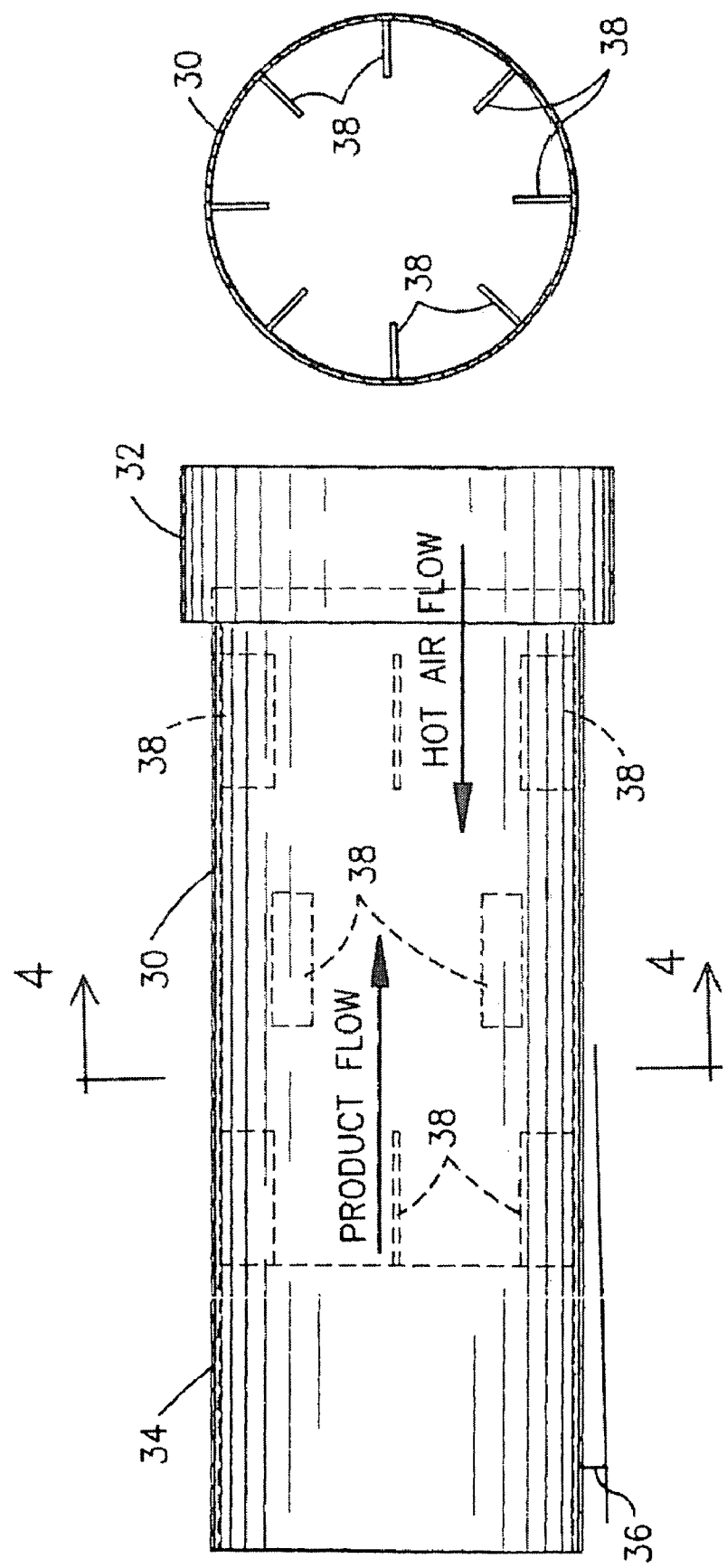

PARTIALLY CHELATED CARBOXYLATE NUTRIENTS AND METHODS FOR THEIR PRODUCTION AND USE

BACKGROUND OF THE INVENTION

1. Field of the Invention

The present invention relates to soil dispersible and partially soluble chelated granular nutrient, water dispersible granular nutrient and to methods for making and using such granular nutrients. More particularly, the present invention relates to granules having such nutrients embedded within a saccharide binder.

2. Description of the Prior Art

Numerous tests and many years of experience of the agriculture industry of the United States have demonstrated the need for certain nutrients for plant growth. Some are more difficult than others to supply in a form which is easily taken up. In soil, there is the further problem of maintaining the nutrients in position over time.

U.S. Pat. No. 5,487,772 to Paul McCoy relates to granules having a crystallized saccharide with carboxylate (sucrates) of a nutrient embedded therein. This reference is hereby incorporated by reference. The method of this patent produces a granular nutrient but also produces dust in the process. Dust causes issues during the loading, unloading and the application process, traveling by air and coating cars, houses, furniture, etc. Furthermore, the resulting nutrient of this method has some issues regarding clumping and has a less-than-desirable shelf life.

U.S. Pat. No. 3,567,460 relates to the use of soil dispersible and water dispersible plant nutrient compounds in a granular form comprising nutrient particles selected from the group made up of metallic oxides, metallic sulphates, metallic oxysulphates and metallic oxysulphates placed within a water-soluble saccharide binder.

U.S. Pat. No. Reissue 32,909 relates to the use of metal oxycarboxylates as suppliers of metal nutrients to plants, animals and humans.

U.S. Pat. No. 4,589,906 relates to the use of various divalent and trivalent metals in organic carboxylate form as starting materials for the formulation of plant fertilizers.

Prior art nutrient compounds generally suffer from disadvantages in clumping and shelf life. Furthermore, dust created in the manufacturing process is undesirable.

Therefore, there is a need for granular nutrient products that retain the nutrient value of the prior art while providing an extended shelf life, making a harder granule thereby reducing clumping. There is a need to create a chelated sucrate nutrient to enhance water solubility. Furthermore, there is a need to reduce dust created during the handling process.

SUMMARY OF THE INVENTION

It is an object of the present invention to provide a chelated sucrate nutrient product which produces minimal dust, remains free flowing in typical applications, does not cake or clump and has a good shelf-life.

It is a further object of the present invention to provide an economical and efficient method to prepare a chelated sucrate nutrient which produces minimal dust, remains free flowing in typical applications and has a good shelf-life.

Accordingly, the present invention is directed toward granular plant nutrient compounds. Nutrient compounds of the present invention are formed by agglomerating or otherwise binding the fines into a granule with glacial acetic acid, citric acid together with a water soluble binder containing a stoichiometric excess of reducing saccharides (sugar cane molasses, beet sugar molasses or any binder containing polysaccharides, disaccharides and monosaccharides) containing at least 76% solids by weight. To provide a product that contains minimal dust, remains free flowing, does not cake or clump and provides a longer shelf life, the nutrient fines undergo a chemical reaction with the binder, glacial acetic acid and citric acid during the process of agglomeration, whereby partially chelated carboxylated nutrients are produced as the end product. By utilizing the teachings of the invention, a certain amount of gas such as carbon dioxide is entrapped in the granule. When the outer coating dissolves in the presence of moisture, the expanding volume of the gas explodes the granule and aids in dispersing the carboxylated nutrients throughout the medium surrounding the original granule.

In one aspect, the invention provides a nutrient product comprising a plurality of nutrient-containing granules prepared by the steps of:

(A) introducing a finely divided powdered oxide of a reducible nutrient-containing compound and citric acid into a mixer and spraying on the powdered compound a specified amount of glacial acetic acid and a saccharide binder having at least 76% by weight solids content, the binder having a stoichiometric excess of reducing saccharides relative to said reducible nutrient-containing compound, and mixing said binder and powdered oxide to form granules having said particles embedded within said binder wherein the reducing saccharides, glacial acetic acid and citric acid react with said reducible nutrient compound to form partially chelated carboxylates (sucrates) of said nutrient;

(B) drying said granules by application of heat between 160° and 175° F.; and (C) curing said granules for a sufficient time period to permit substantial termination of exothermic carboxylate-forming (sucrate-forming) reactions.

In another aspect, the invention provides a soil dispersible and water dispersible and partially water soluble granular nutrient for use in fertilizers or animal feeds, said nutrient including granules comprised of a crystallized saccharide binder having carboxylates (sucrates) of a nutrient embedded therein, the carboxylate partially chelated by reducing the reducible nutrient compound with a stoichiometric excess of reducing saccharides, glacial acetic acid and citric acid.

In another aspect, the present invention provides a method of producing a granular nutrient comprising the step of converting a reducible nutrient compound to a nutrient carboxylate (sucrate) partially chelated by reducing the reducible nutrient compound with a stoichiometric excess of reducing saccharides, glacial acetic acid and citric acid.

In another aspect, the invention provides a method of supplying nutrients to a plant or animal comprising administering to said plant or animal an effective amount of a granular nutrient having granules comprised of a crystallized saccharide binder, and embedded within said binder, carboxylates (sucrates) of a nutrient the carboxylate partially chelated by reducing the reducible nutrient compound with a stoichiometric excess of reducing saccharides, glacial acetic acid and citric acid.

Other features and advantages of the present invention will become apparent from the following description of the invention which refers to the accompanying drawings.

For the purpose of illustrating the invention, there is shown in the drawings an embodiment which is presently preferred; it being understood, however, that the invention is not limited to the precise arrangements and instrumentalities shown.

BRIEF DESCRIPTION OF THE DRAWING

FIG. 2 is a side elevation view of an exemplary rotary dryer used in the manufacturing process.

FIG. 3 is an end view of an exemplary rotary dryer.

DETAILED DESCRIPTION OF THE INVENTION

Figure 1:
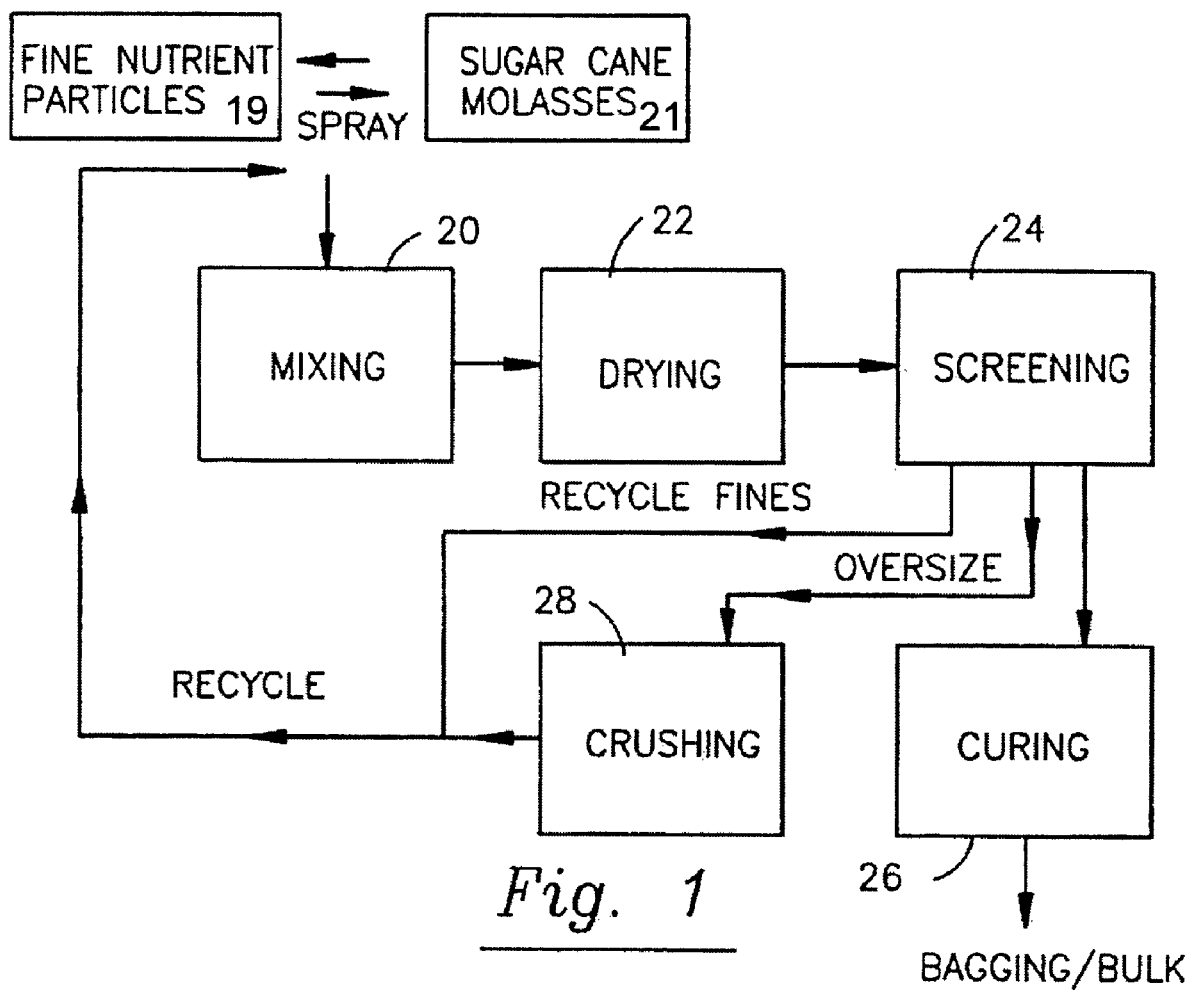
FIG. 1 is a schematic drawing showing the process steps of one preferred manufacturing process in accordance with the invention.

Preferred nutrients which are provided in accordance with the invention include major primary nutrients without which life cannot be sustained (e.g., phosphate and potassium) and secondary nutrients required in some quantities for growth and nutrients which, even if not necessary to sustain life, will further improve plant and/or animal growth and health. These nutrients are well known in the art. Among the nutrients which may be supplied in accordance with the invention are cationic nutrients such as manganese, zinc, copper, iron, calcium and magnesium. Cationic nutrients are especially useful in accordance with the invention.

The invention utilizes, as starting compounds: a reactant binder, citric acid, glacial acetic acid and reducible compounds which include desired nutrients in the form of oxides, sulfates and other reducible compounds and salts. The reducible compounds are reduced in the presence of reducing sugars in the binder, (i.e., monosaccharides and aldehyde-functional disaccharides) and form carboxylates (sucrates) of said nutrient. The addition of a pre-determined amount of citric acid converts the desired amount of carboxylate to a chelated carboxylate. For example, when a cationic metal nutrient compound such as a metal oxide is reacted with reducing sugars and citric acid, the desired amount of metal carboxylate and chelated carboxylate (sucrate) products are formed in an exothermic reaction. A stoichiometric excess of reducing sugars and glacial acetic acid sprayed onto a finely divided powdered oxide and citric acid is preferred because it is desirable to create as much carboxylate and chelated carboxylate (sucrate) product as possible while producing as little dust as possible and leaving behind only a small amount of unreacted reducible nutrient compounds. Preferably the ratio of product carboxylate (sucrate) to unreacted starting nutrient compounds should be at least 1:1, preferably 3:1 and more preferably, in excess of 9:1. It is believed that the uptake of product carboxylate (sucrate) is greatly improved relative to the starting compounds such as metal oxides. In addition and in order to achieve a harder, more dust-free granule, glacial acetic acid is added to the extent of from 1% to 10% by volume of the total molasses and water binder mixture, preferably 3%.

Suitable starting compounds include, but are not limited to various oxides of manganese, zinc, copper, calcium, iron and magnesium (e.g., MnO, $Fe_2O_3$ and FeO). Additionally, mixtures of the oxides can be used, for example, mixtures of iron and manganese oxides in a ratio between about 1.5:1 and 2.0:1 by weight. In order to achieve partial chelation and additional water solubility, citric acid is added, preferably at a rate greater than the equivalent of 100 pounds per ton of finished product (5%), but not so much as to reduce the practical assay of the finished product. Citric acid is added at a rate of anywhere between 10 pounds and 600 pounds per ton of finished product (between 0.5% and 30% by weight).

Referring to FIG. 1, the reducible starting compounds including citric acid are preferably formulated as fine nutrient particles 19 (e.g., about 44 microns or smaller) and are introduced into a mixer 20 as a powder countercurrent to a spray of the binder 21 which contains at least 76% by weight solids. The binder crosses the stream of reducible starting oxide compound allowing the binder, glacial acetic acid and starting oxide compounds to meet. The binder 21 provides the reducing sugars and acid which react with the starting compounds to form carboxylates (sucrates), and also provides the saccharides which preferably form a crystalline shell about the carboxylates (sucrates) that are formed.

The starting material 19 and binder 21, after making contact, fall into the mixer 20. A mixer which can be utilized, for example, is a drum open at one end having a diameter of about 48 inches and an interior length of about 30 inches. The drum is angled so that its open end is above its closed end, and the drum is rotated about its cylindrical axis. In an alternate embodiment, a pan or dish granulator with or without a high speed mixer is used. As the drum is rotated, granules of the binder are formed having embedded therein a combination of starting compounds, product carboxylates and citrates (chelated sucrates). It should be noted that some of each is expected because the conversion of starting material 19 to carboxylate (sucrate) begins at initial contact but is not completed until a later curing step described below.

The granules grow in size as additional binder is continually coated about the outer surface of the granule in the mixer or granulator. Time in the mixer or granulator preferably varies between about 1 minute and 5 minutes depending upon the size of granule desired. For a granule of −6+16 mesh size (U.S. standard sieve) about 3 to 5 minutes is appropriate. For granules of −10+20 mesh size, 1-2 minutes may be sufficient.

Preferably the starting compound and binder combine to form a very fine granule in the cross spray described above, then fall to the bottom of the mixer and are gradually displaced forward as they grow, until they reach the desired granule size and fall out the open end. Depending upon the desired granule size, rate of introduction of starting components are adjusted to cause the particles to progress at a rate which leaves them in the mixer for the desired time period. In accordance with the invention, no granulator is required between the mixing step and a subsequent drying step 22.

Additionally, the binder 21 and starting nutrient 19 compound can be introduced with a screw conveyer which has the additional advantage of helping control granule size. Because of the heat created by the ongoing exothermic reaction, drying also begins.

The saccharide binder is preferably a mixture of large and small polysaccharides containing at least 76% solids with a minimum hydrometer brix of 82, which includes a high concentration of reducing sugars for participation in the reaction. In addition, this binder contains glacial acetic acid to the extent of approximately 1% to 10% by volume, preferably 3% of the volume of molasses and water. Hydrometer brix was first derived for pure solutions of sucrose and relates the specific gravity of a sucrose solution to its total sucrose content. In the case of pure sucrose the degrees brix is equivalent to the total sucrose content and also the total solids content on a weight/weight basis.

In a preferred embodiment of the invention, the binder is a mixture consisting essentially of cane sugar, citric sugar or beet sugar molasses, glacial acetic acid and water, wherein the water is present in a concentration of 25% (by weight based on weight of the molasses and water combination), and more preferably 35% to 50% water (e.g., a mixture of 60% molasses and 37% water and 3% glacial acetic acid). The high concentration of water breaks down higher polysaccharides into both reducing monosaccharides and also aldehyde-containing disaccharides. Together with the reducible starting compound (containing citric acid), these saccharides react to form chelated carboxylates in accordance with the reactions set forth below. The resulting nutrient carboxylate is more available for uptake than the starting nutrient compounds (e.g., oxides).

A typical product of the reaction is thus a chelated carboxylate of a cationic nutrient having the formula:

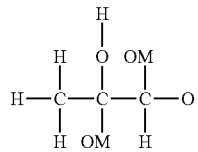

wherein M is the nutrient cation from the group manganese, iron, zinc, copper, magnesium or calcium.

In some instances, when M is manganese, the product of the reaction is a chelated carboxylate of a cationic nutrient having the formula:

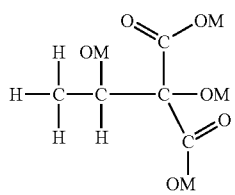

Without intending to be bound by theory, it is believed that amorphous polysaccharides break down to the aldehyde forms of disaccharides and monosaccharides and indeed to such sugars (carbohydrates) as d-glucose, d-mannose, d-fructose, etc.

Such reducing sugars have the general aldehyde structure:

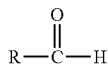

wherein R is the saccharide residue.

With water and heat (energy), polysaccharides are hydrolyzed to disaccharides and then to monosaccharides. Plants do this with photosynthesis and actually secrete carboxyl groups to take up nutrients in ion exchange reactions.

Monosaccharides also undergo hydrolysis with water to convert from the aldehyde form to the carboxylate ion

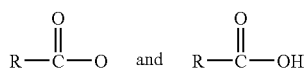

wherein R is the saccharide residue.

In the presence of some cations, notably Zn and Fe, even in the forms of ZnO, FeO and $Fe_2O_3$, the reaction potential is greater to form a zinc or iron carboxylate

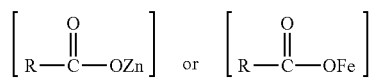

rather than the weak acid

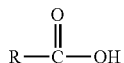

wherein R is the saccharide residue.

As can be seen from the above ion formations, the monosaccharide is actually oxidized by reducing the cation oxide. Indeed, this to be expected since monosaccharides are reducing agents and act as such in the process.

In the addition of citric acid the resultant carboxylates formed in the above reactions tend to be surrounded with a more exotic structure as shown:

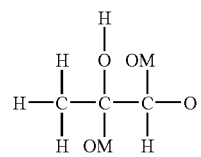

wherein M is the nutrient cation from the group manganese, zinc, copper, iron, magnesium or calcium.

When citric acid or 1,2,3 tricarboxy-2-hydroxypropane is added, then a chelate (grouping or claw) forms (as above) to protect the resultant carboxylate from oxidation.

When glacial acetic acid is added to the binder and sprayed onto the compound, an acetate is formed as well. This acetate helps to create a hard and dust free granule.

In order to achieve these hard and dust free chelated carboxylates (sucrates), it has now been found necessary to use excess reducing saccharides with 1% to 10%, preferably 3% of the initial fluids in the manufacturing process being glacial acetic acid. This assures a more than ample supply of reducing sugars, carbonyl groups and carboxyl groups, not only to achieve the desired ionization but to keep the oxygen seeking cations in the reduced state. The addition of the glacial acetic acid to the extent of 1% to 10% by volume, preferably 3% of the water portion of the binder, as mentioned above, assures the proper concentration of acetate to create a hard and dust free granule.

The binder comprises a water soluble polysaccharide and/or a monosaccharide, such as the aldehyde forms of sugars, d-glucose (aldehyde form), d-mannose, d-fructose, osone, maltose, molasses, molasses extract, or cane sugar extract mixed with water. For example, 15 gallons of cane sugar molasses (176 lbs. wet weight or 134 lbs. dry weight) with 9 gallons of water and 1 gallon of glacial acetic acid can be used. Molasses often contains at least 48% sugars (carbohydrates: monosaccharides, disaccharides and polysaccharides) with from 12% to 16% sucrose. A preferred binder is 60% molasses, 37% water, and 3% glacial acetic acid.

By way of illustration but without limitation, a typical formulation is shown below. A like amount by weight of a manganese or zinc oxide can be substituted for the iron oxide on the following example.

| | Iron, 50% Fe |
|---|---|
| 1470 lbs. | Iron Oxide, 68% Fe |
| 300 lbs. | Citric acid (100 to 300 lbs depending on required chelation) |
| 66 lbs. | Lime, gypsum or other filler |
| 134 lbs. | Binder (dry wt. or 176 lbs. wet + water) |
| 29 lbs. | H2O |
| 1 lbs. | Glacial acetic acid |
| 2000 lbs. | Total |

All above weights and measures are given in terms of per net ton of final product.

The output of the mixer 20, in granular form, is fed to a rotary dryer 20. (Drying step 22 is carried out in the dryer.) A modified rotary dryer 30, should be used as shown in FIGS. 2-3. A preferred drying unit allows progression of the granules from a "cold" end to a "hot" end thereof. In an alternate embodiment, the drying unit allows progression of the granules for a "hot" end to a "cold" end, thereof. See FIGS. 2-3. (It should be noted that even the cold end is well above ambient temperature.) Such a drying unit may include a heat source 32 at its hot end of a forty foot circular dryer about five feet in diameter with a counter current air flow moving in a direction opposite to the motion of the granules (i.e., away from the hot end 32 and toward the cold end 34). The air naturally cools as it travels toward the cold end and away from the heat source. The temperature range at the hot end is preferably from 160° F. to 175° F. Temperatures above 180° F. are undesirable since it tends to drive the chemical reaction back to oxides from the desirable carboxylates (sucrates) and burn the molasses. At 175° F. the granules should remain in the dryer about 15-20 minutes and at 160° F. about 25 to 30 minutes. The mixing apparatus can be any suitable mixer (e.g., cement mixer, drum, dish, pug mill, and auger) and the dryer apparatus can be any suitable dryer that can produce the necessary amount of heat (e.g., rotary dryer and fluid bed dryer).

The moisture content of the material being fed to the dryer is preferably between 5% and 20% depending upon the desired size of the final granules and their desired porosity. Typical granules have a dryer input moisture content of 10% to 12% and a dryer output moisture content of 1% to 5%. The average temperature of the dryer should not exceed nominally 175° F. The finished product temperature should not exceed the same 175° F. The dryer should have a slight angle of inclination 36 at its cold end and fins or flights 38 to lift and tumble the granules.

From drying step 22, the material is fed to screening step 24. At this step, where granules (−8+20 for example) are to be shipped, all granules larger than 8 mesh are fed to crushing step 28 where any standard crusher (i.e., a rolls crusher) is used to pulverize the oversize granules. All granules smaller than mesh 20 (considered to be fines for this purpose) are also screened out. Both the fines and the pulverized coarse granules are recycled back to the mixer and reprocessed by the method of the invention.

The proper size granules are preferably then cured in the curing step 26 for a sufficient time period to permit substantial termination of exothermic carboxylate-forming reactions. Preferably the product is cured until it has returned to ambient temperature, and preferably for at least 12 to 24 hours thereafter. Subsequently, the product is fed to a packaging step as required or formulated as a component into other nutrient-containing products.

Although the present invention has been described in relation to particular embodiments thereof, many other variations and modifications and other uses will become apparent to those skilled in the art. It is preferred, therefore, that the present invention be limited not by the specific disclosure herein, but only by the appended claims. Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A cationic granular nutrient containing at least 50% dry weight of a salt of saccharic acid of the formula:

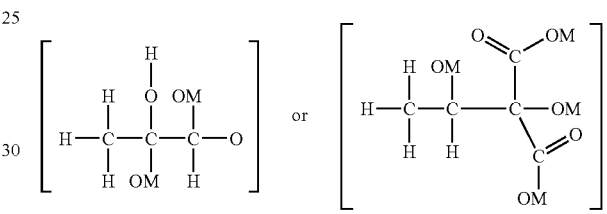

wherein M is a nutrient cation selected from the group consisting of manganese, zinc, copper, iron, magnesium and calcium; the cationic granular nutrient being prepared by spraying a binder of glacial acetic acid, water and a saccharide on a starting compound of citric acid and a finely divided powdered oxide of a reducible nutrient-containing compound having the formula MO wherein M has the same meaning as set forth above; thereafter, drying in a rotary dryer at a temperature of 160° to 175° F. and curing to form the cationic granular nutrient.

2. The cationic granular nutrient of claim 1, wherein the starting compound includes 5% citric acid by weight.

3. The cationic granular nutrient of claim 1, wherein the starting compound includes from 0.5% to 30% citric acid by weight.

4. The cationic granular nutrient of claim 1, wherein the cationic granular nutrient is formed by drying in a rotary dryer at about 160° F. while tumbling for 25 to 30 minutes.

5. The cationic granular nutrient of claim 1, wherein the cationic granular nutrient is formed by drying in a rotary dryer at about 175° F. while tumbling for 15 to 20 minutes.

6. The cationic granular nutrient of claim 1, wherein the saccharide is selected from the group consisting of cane sugar, citric sugar and beet sugar.

7. The cationic granular nutrient of claim 1, wherein the binder includes 3% glacial acetic acid by volume.

8. The cationic granular nutrient of claim 1, wherein the binder includes from 1% to 10% glacial acetic acid by volume.

9. The cationic granular nutrient of claim 1, wherein the binder includes 25% water by weight.

10. The cationic granular nutrient of claim 1, wherein the binder includes from 35% to 50% water by weight.

11. A cationic granular nutrient containing at least 50% dry weight of a salt of saccharic acid of the formula:

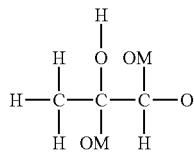

wherein M is a nutrient cation selected from the group consisting of manganese, zinc, copper, iron, magnesium and calcium; the cationic granular nutrient being prepared by spraying a binder of glacial acetic acid, water and a saccharide on a starting compound of citric acid and a finely divided powdered oxide of a reducible nutrient-containing compound having the formula MO wherein M has the same meaning as set forth above; thereafter, drying in a rotary dryer at a temperature of 160° to 175° F. and curing to form the cationic granular nutrient.

12. The cationic granular nutrient according to claim 11, wherein the starting compound includes 5% citric acid by weight.

13. The cationic granular nutrient according to claim 11, wherein the starting compound includes from 0.5% to 30% citric acid by weight.

14. The cationic granular nutrient according to claim 11, wherein the cationic granular nutrient is formed by drying in a rotary dryer at about 160° F. while tumbling for 25 to 30 minutes.

15. The cationic granular nutrient according to claim 11, wherein the cationic granular nutrient is formed by drying in a rotary dryer at about 175° F. while tumbling for 15 to 20 minutes.

16. The cationic granular nutrient according to claim 11, wherein the saccharide is selected from the group consisting of cane sugar, citric sugar and beet sugar.

17. The cationic granular nutrient according to claim 11, wherein the binder includes 3% glacial acetic acid by volume.

18. The cationic granular nutrient according to claim 11, wherein the binder includes from 1% to 10% glacial acetic acid by volume.

19. The cationic granular nutrient according to claim 11, wherein the binder includes 25% water by weight.

20. The cationic granular nutrient according to claim 11, wherein the binder includes from 35% to 50% water by weight.

21. A method of making a granular nutrient containing at least 50% dry weight of a salt of saccharic acid of the formula:

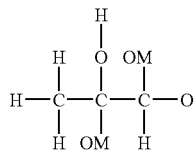

wherein M is a nutrient cation selected from the group consisting of manganese, zinc, copper, iron, magnesium and calcium, the method comprising:

spraying a binder of glacial acetic acid and a saccharide onto a starting compound comprised of a powdered oxide of a reducible nutrient-containing compound and citric acid into a means for mixing;

mixing the binder and starting compound in the means for mixing to form granules having the particles embedded within the binder wherein the saccharide, glacial acetic acid and citric acid react with the reducible nutrient-containing compound to form partially chelated carboxylates (sucrates) of the nutrient cation;

drying the granules by application of heat between 160° and 175° F.; and curing the granules to permit substantial termination of exothermic carboxylate-forming (sucrate-forming) reactions.

22. The method of making a cationic granular nutrient according to claim 21, wherein the heat is 160° F. and said time period is 25 to 30 minutes.

23. The method of making a cationic granular nutrient according to claim 21, wherein said heat is 175° F. and said time period is 15 to 20 minutes.

24. The method of making a cationic granular nutrient according to claim 21, wherein the means for mixing is a drum mixer.

25. The method of making a cationic granular nutrient according to claim 21, wherein the means for mixing is a pan granulator.

26. The method of making a cationic granular nutrient according to claim 21, wherein the means for mixing is a dish granulator.

27. The method of making a cationic granular nutrient according to claim 21, wherein the reducible nutrient-containing compound is selected from the group consisting of manganese oxide, zinc oxide, copper oxide, iron oxide, magnesium oxide and calcium oxide.

28. The method of making a cationic granular nutrient according to claim 21, wherein the starting compound includes 5% citric acid by weight.

29. The method of making a cationic granular nutrient according to claim 21, wherein the starting compound includes from 0.5% to 30% citric acid by weight.

30. The method of making a cationic granular nutrient according to claim 21, wherein the saccharide is selected from the group consisting of cane sugar, citric sugar, beet sugar, aldehyde forms of sugars, d-glucose (aldehyde form), d-mannose, d-fructose, osone, maltose, molasses and molasses extract.

31. The method of making a cationic granular nutrient according to claim 21, wherein the binder includes 3% glacial acetic acid by volume.

32. The method of making a cationic granular nutrient according to claim 21, wherein the binder includes from 1% to 10% glacial acetic acid by volume.

33. The method of making a cationic granular nutrient according to claim 21, wherein the binder includes 25% water by weight.

34. The method of making a cationic granular nutrient according to claim 21, wherein the binder includes from 35% to 50% water by weight.

* * * * *